United States Patent [19]

Elsholz et al.

[11] 4,099,770

[45] Jul. 11, 1978

[54] SAFETY DEVICE FOR AUTOMOBILE OCCUPANTS

[75] Inventors: Joachim Elsholz, Berg; Manfred Bortfeld; Josef Maertz, both of Eching; Erhard Poser, Munich, all of Fed. Rep. of Germany

[73] Assignee: Bayerische Motoren Werke Aktiengesellschaft, Fed. Rep. of Germany

[21] Appl. No.: 741,880

[22] Filed: Nov. 15, 1976

[30] Foreign Application Priority Data

Nov. 15, 1975 [DE] Fed. Rep. of Germany ....... 2551419

[51] Int. Cl.² ........................................ A62B 35/00
[52] U.S. Cl. .................................. 297/216; 297/389
[58] Field of Search ............... 297/384, 385, 386, 388, 297/389, 216; 280/747

[56] References Cited

U.S. PATENT DOCUMENTS

| 2,898,976 | 8/1959 | Barecki | 297/386 X |
|---|---|---|---|
| 3,547,489 | 12/1970 | Grieser | 297/385 |
| 3,888,509 | 6/1975 | Wiley | 280/747 |
| 3,891,272 | 6/1975 | Takada | 297/386 |
| 3,934,934 | 1/1976 | Farrell, Jr. | 297/384 |
| 3,954,280 | 5/1976 | Roberts et al. | 297/389 |
| 3,971,569 | 7/1976 | Abe | 297/386 |
| 4,025,111 | 5/1977 | Tanaka | 297/216 |

FOREIGN PATENT DOCUMENTS

| 2,034,740 | 1/1972 | Fed. Rep. of Germany | 280/747 |
|---|---|---|---|
| 97,633 | 3/1961 | Norway | 280/747 |
| 300,930 | 5/1968 | Sweden | 280/747 |
| 925,700 | 5/1961 | United Kingdom | 280/747 |
| 1,010,272 | 11/1965 | United Kingdom | 297/384 |

*Primary Examiner*—James T. McCall
*Attorney, Agent, or Firm*—Craig & Antonelli

[57] ABSTRACT

A device for the safety of occupants on automotive vehicle seats having two straps for extending over the occupant's shoulders with the two straps being combined in superposed relation at a distance behind and substantially above the shoulders of the occupant. A first securing arrangement is provided for coupling the combined straps to a portion of the vehicle and a second securing arrangement is provided which is securable to at least one portion of the vehicle and extends along at least a portion of the width of the vehicle seat. Guide devices are coupled to and movable with respect to the second securing arrangement with the guide devices receiving the two straps extending over the shoulders of the occupant and diverting the end portions of the straps at the level of the pelvis of the occupant to form lap belt portions connectable in front of the occupant. A seat member may also be provided which is retained on the vehicle seat by the guide devices.

9 Claims, 4 Drawing Figures

SAFETY DEVICE FOR AUTOMOBILE OCCUPANTS

The present invention relates to a device for the safety of occupants on automotive vehicle seats, especially children on rear seats in passenger cars, with two belt straps extending over the occupant's shoulders fashioned to be connectable with each other in front of the occupant by means of their end portions diverted at the level of the pelvis, as well as with a seat element for a child to be secured, which seat element can be arranged as desired on the fixed seat of the automobile.

Such a device has been disclosed in U.S. Pat. No. 3,158,399 and comprises the body belts as well as the seat element for a child being connected to the vehicle body by way of holding straps. Two holding straps tensioned over the backrest of a seat fixedly joined to the vehicle are utilized, which intersect in their extension on the backrest. In the point of intersection of the holding straps, a fitting with a free slot is arranged. Each holding strap is equipped, in its further extension on the backrest, directed downwardly from the point of intersection, with a fitting over which a section of the holding strap can be formed into a loop. Both loops are respectively connected to an eyelet fitting. A belt band having a free end and an end provided with a buckle or latch runs through the aforementioned slot in the fitting at the point of intersection of the holding straps as well as over the eyelet fittings. The belt band extends over the shoulders of a child in its sections between the fitting at the point of intersection and the respective eyelet fitting. The end sections of the belt band and/or the shoulder straps deviated by the eyelet fittings arranged at the level of the child's pelvis are joined together approximately in the abdominal area in front of the child. For this purpose, the end section of the shoulder strap is pulled with the free end through the aforementioned buckle at the end portion of the other shoulder strap. When an appropriate looseness of the straps of the body belt has been attained, the end section of the first-mentioned shoulder strap running through the buckle is blocked by means of the buckle.

The seat element for the child has a square configuration. On the end face oriented toward the backrest, the seat element has loops, by way of which the seat element is connected to the holding straps.

The above-described device has considerable deficiencies.

In their extension to the anchoring points at the vehicle body, the holding straps are in contact with the upper as well as lower portions or edges of the backrest. To prevent the holding straps from pressing into the backrest at the aforementioned locations during the stress of a collision, the framework of the backrest must be made to be rigid especially at the upper and lower edges. This leads to an additional expenditure in construction. If this measure is not taken, then the holding straps can, in case of stress, deeply impress themselves at the upper and lower portions of the backrest. The consequence thereof is an additional forward displacement of the child during an accident, whereby the child can impact against the backrest of the vehicle front seats.

The seat element which, as mentioned above, has a square shape, has a planar seating surface. Thus, the seated child is without lateral hold. Furthermore, the seat element does not permit a convenient position for the legs to keep them free of fatigue for a long period of time, since there is no support for the thighs up to the back of the knees and, in the case of small children, a position wherein the legs are stretched cannot be prevented.

In connection with the shoulder straps, a disadvantage to be emphasized is that they are too long, since they extend after the shoulders of the child over the back to the fitting in the point of intersection of the holding straps lying at a level which is lower as compared to the child's shoulders. Thus, the child has a restricted movability in the upper body portion. The shoulder straps, which are too long, however, do not maintain the upper portion of the body in the upright seat position in case of an impact of the automobile. Rather, the upper part of the body, caused by the head, which as is known is disproportionately heavy in children, tilts about the hips in the direction toward the thigh with the result that the child slides along the shoulder straps with his or hers shoulders.

Due to the connection of the seat element with the holding straps by way of wide loops on the end face of the seat element facing the backrest, as effected in the arrangement, the two eyelet fittings cannot be arranged, as is necessary, at a low level with respect to the child's pelvis. Thereby, the body belt disadvantageously extends largely in the relatively soft abdominal area of the child's body, rather than over thighs and pelvis, resulting in a restraining of the lower portion of the child's body during a collision by way of this body area which leads to considerable and dangerous or severe injuries.

Additional disadvantages reside in the manipulation of the aforementioned conventional device. In order to adjust the aforementioned system to varying body sizes, the fitting for the shoulder straps arranged in the point of intersection of the holding straps is to be adjusted as long as the seat element is retained. To change the position of the point of intersection of the holding straps on the backrest in the direction toward the upper or lower edge, the loops formed by fittings in the holding straps must be changed in their size. The holding straps cooperate by a frictional connection with the fitting provided for the formation of the loops. For this reason, the reduction or enlargement of the loops is connected with an expenditure in force. In case of a clumsy adjustment of the loops, it may furthermore be necessary to correct the position of the loop fitting with respect to the seat element or, when the seat has been removed, with respect to the seat cushion of the seat fixedly mounted to the vehicle. Therefore, the manipulation of the device for adjustment to different body sizes requires a large amount of force and is cumbersome.

The belt band forming the two shoulder straps as well as the body strap is not fixed in any of the three fittings guiding the belt band. Due to this free mobility of the belt band in the fittings, the position of the buckle or latch when the body belt has been applied in the abdominal region in the center of the child's body is not reliably ensured. Such a position of the buckle or latch is of significance, in particular, for purposes of freeing the child from the device by third parties in case of an emergency situation.

A disadvantage residing in the manipulation regarding the application of the aforementioned belt band is that, with each application, one of the end sections must be threaded into the buckle at the other end section. By handling the buckle, the child can change the looseness of the belt in the body and shoulder straps so that, in case of an accident, the child may slide out of the shoulder straps. Restraint is then merely effected by way of the body strap, which may lead to an impact on the backrest of the vehicle front seat, but at least may result in severe bodily injuries by the body strap.

The conventional device furthermore offers little convenience for the child, namely on the one hand due to the fact that the seat element is not molded to the contours of the body, and on the other hand due to the restriction of the mobility of the upper body portion as discussed above.

It is therefore an object of the present invention to provide a device of the type mentioned in the foregoing without the disadvantages regarding the arrangement at the vehicle body, the belt geometry, as well as the manipulation and finally the convenience accorded to an occupant, especially a child.

In accordance with the present invention, the safety device includes the combination of the following features:

The guiding arrangements for the end sections and/or the lap belt portions are arranged to be slidingly movable on a device extending at the vehicle body transversely of the vehicle. In this connection, each of the guiding arrangements consists of a eyelet fitting and a connecting element, formed from parts which can be coupled together, for connection to the aforementioned device. Furthermore, the two shoulder straps are combined at a distance behind the occupant substantially above the shoulders of the latter and cooperate, in superposed position, with a length-adjusting fitting arranged at an energy-absorbing member fashioned to be detachable at both ends. This energy-absorbing member is connected to a belt band of an automatic retractor arranged at the vehicle body.

According to another embodiment, a seat element is provided for a small child which seat element is fashioned on two opposed sides with differently large seat contours, wherein the seat contours are defined by lateral walls, and perforations adapted to the connecting elements are arranged in the lateral walls to retain the seat element by way of the connecting elements.

The device discussed in the initial features of the combination is known for U.S. Pat. No. 2,804,313 as a belt band extended over a seat and laterally of the seat to anchors at the bottom of the vehicle. In case of a stress due to a collision, the belt band cuts into the sides of the seat, so that a strapped-in person, restrained at the shoulders by way of additional straps, is flung forward with the lower portion of the body on account of this "belt extension" and thus executes the diving motion known as "submarining" with the danger of considerable injuries in the abdominal region by the upwardly sliding body belt. This is advantageously avoided by arranging the aforementioned device behind a seat, especially a rear seat, at the vehicle body. In this connection, the longitudinal adjustability of the device serves for adaptation to the anchoring points provided at the body of a particular car, whereby the device can be utilized for securing children in all popular passenger cars. The economical advantage achieved thereby is considerable.

With the arrangement of the device as selected above, the guide arrangements for the end sections, forming the lap belt portions of the shoulder belts, which latter extend in a V-shape according to a further feature of the combination, are to be arranged between the seat and the backrest of a seat fixedly mounted to the vehicle. This makes it impossible for a rather young child to change the position of the guide means to one which is less favorable for restraint, by playing with these guide means. However, furthermore the narrow V-shaped extension of the shoulder straps, necessary for a satisfactory restraint of the child, is likewise ensured.

Finally, it is possible to obtain an extension of the body belt which runs steeply downwardly to the guide means by a low-level arrangement of the device as compared to the seating surface of the seat or as compared to the seat element to be arranged on the seat. Thus, this body belt becomes a genuine lap belt lying on the child's thighs and effectively looped around the front region of the pelvis.

The construction of the guide means as provided by another feature is to be seen in conjunction with the seat element. Once the child is too large for the small contour seat, the seat element is turned around to utilize the large contour. As soon as the latter can no longer be used, the seat element is removed. To avoid a disassembly and assembly of the device each time the aforementioned changes are made, the connecting members of the guide means are formed from two parts which can be coupled together. The conversion of the device according to the invention from serving a small child requiring the contour seat to serving an older child who does not require the seat element can be effected in a suitable manner by providing that the parts of the connecting members cooperating with the device are each equipped with a eyelet fitting. The second parts of the connecting members, which penetrate the seat element to hold the latter in position, can be hung into these eyelet fittings. Also, if the seat element is unnecessary, the straps extending over the child's shoulders are to be threaded into these eyelet fittings which may be arranged in the corner of the seat cushion and the back of a seat fixedly mounted to the vehicle.

By means of this construction of the connecting members, the coupling means pressing on the child's pelvis can be avoided when the seat element is unnecessary.

The aforementioned belt bands extended over the child's shoulders are inserted in a length-adjusting fitting as known, for example, from U.S. Pat. No. 3,486,793. Especially due to the position of the length-adjusting fitting behind the child, the latter is incapable of changing the adjustment of the belt bands so that the child can free herself or himself from the belt bands. The length-adjusting fitting is advantageously fashioned so that the adaptation of the two belt bands forming the lap belt and the two shoulder straps to the child's body size takes place with one hand.

If the length-adjusting fitting is connected to the belt band of an automatic retractor, it is necessary for single-hand setting for the automatic retractor to block with respect to belt pull-out acceleration. By means of the length-adjusting fitting, arranged centrally with regard to both belt bands, the latter can both be adjusted uniformly in their lengths, so that also the central position of the lap belt is preserved.

An energy-absorbing member fashioned to be detachable at both ends and arranged at the vehicle body between the length-adjusting fitting and the anchoring point is known from DOS (German Unexamined Laid-Open Application) No. 2,227,454. By this arrangement, it is possible in a simple and economical manner to exchange an energyabsorbing member set in its characteristic to a low weight for an absorbing member set to a higher weight of the growing child in its characteristic. However, the characteristic can also be varied by arranging several absorbing members in series or in parallel. Additionally, the automatic retractor serves for making it possible for the child to move his or her upper body to a certain extent.

These and further objects, features and advantages of the present invention will become more obvious from the following description when taken in connection with the accompanying drawings which show, for purposes of illustration only, a single embodiment in accordance with the present invention.

Figure 1:
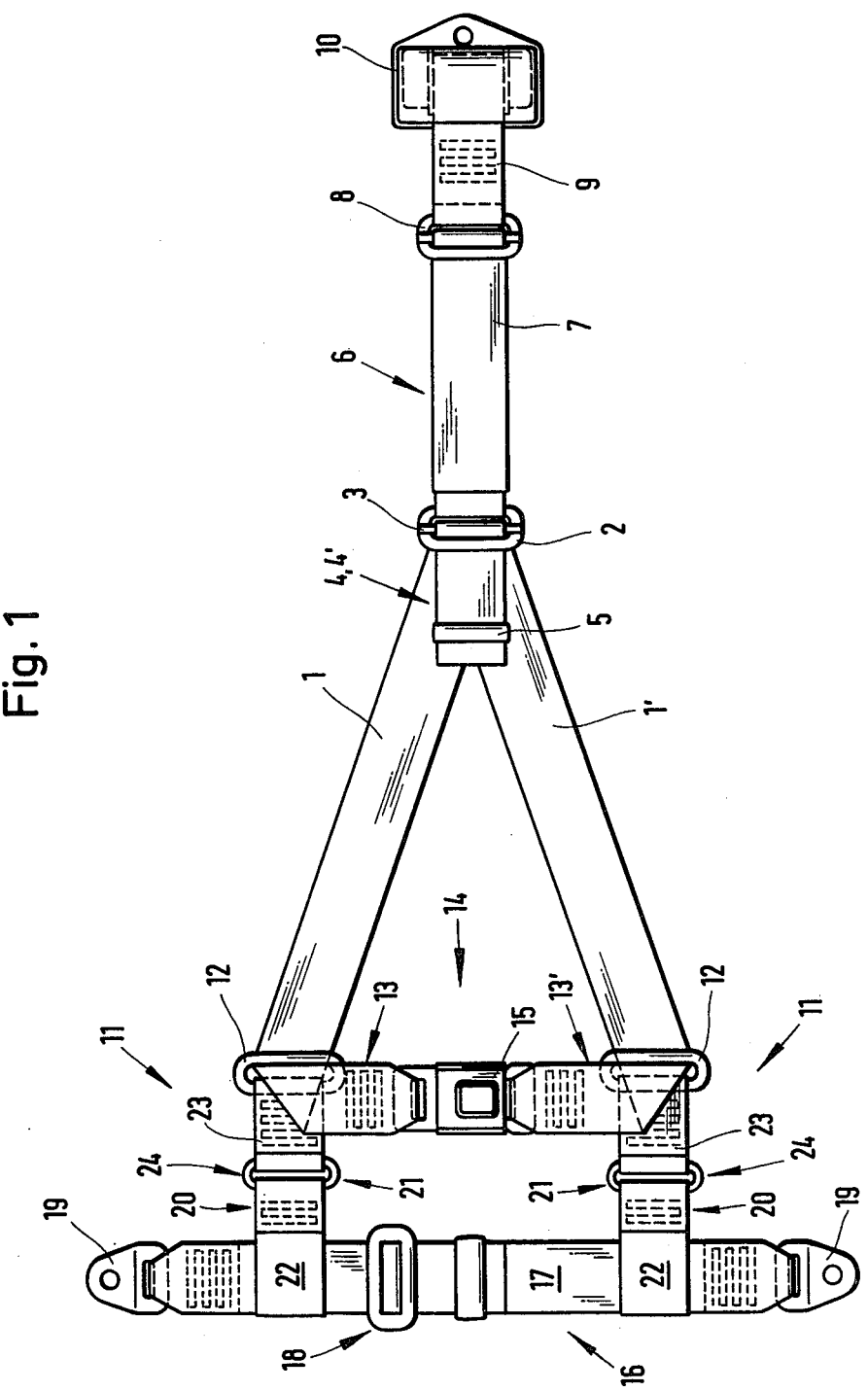
FIG. 1 illustrates the geometrical configuration of the belt of safety device according to the present invention.
Figure 4:
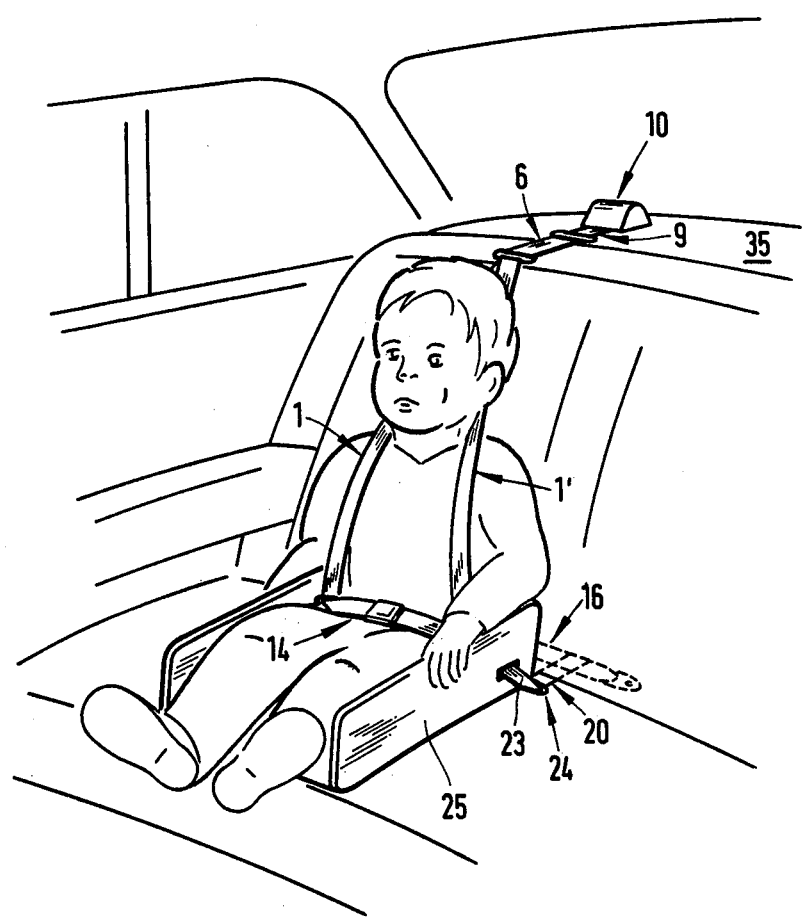
FIG. 4 illustrates a total arrangement of the present invention in a perspective view.

Referring now to the drawings wherein like reference numerals are utilized to designate like parts throughout the several views, there is shown in FIG. 1 a safety device for securing an occupant on a rear seat of a passenger car (not shown) including two shoulder straps 1 and 1'. These straps are combined, according to FIG. 4, in a V-shape within a length-adjusting fitting 2 behind a child and substantially above his or her shoulders. The length-adjusting fitting 2 may be of the type wherein a perforation in the fitting 2 is overlapped by a movably arranged latch 3. The two shoulder straps 1, 1' loop in superposition around the latch 3 so that the free ends 4, 4' of the shoulder straps 1, 1' exit from the fitting 2 in the direction toward the child. A bracket 5 holds the free ends 4, 4' of the shoulder straps together.

The length-adjusting fitting 2 is disposed on an energy-absorbing member 6, which latter is not illustrated in detail and is preferably fashioned as a tear member. The tear member 6, surrounded by a cuff 7 is connected by way of a fitting 8 with a belt band 9 of an automatic retractor 10. By way of the fitting 8, the release member 6 can be detached from the belt band 9. For detachment from the shoulder straps 1, 1', the ends of the shoulder straps 4, 4' are pulled out of the length-adjusting fitting 2 after removal of the bracket 5. The automatic retractor 10, which can be arranged on or below a hat shelf 35 (FIG. 4), can be equipped with one of the conventional blocking devices.

The shoulder straps 1, 1' cooperate with the guide arrangements 11. Each of the guide arrangements 11 comprises a eyelet 12, by way of which the shoulder straps 1, 1' are deflected below a child's pelvis and constitute a lap belt 14 with the deflected end sections 13, 13'. To form the lap belt 14, the end sections 13, 13' are connectable with each other by way of a buckle or latch 15. The buckle 15 is preferably a push-button buckle.

The guide arrangements 11 are arranged to be slidably movable on a device 16 extending at the car body transversely of the vehicle. The device 16 is attached to the car body behind a rear seat of a passenger car. This device is preferably formed from a belt band 17. The belt band 17 is fashioned to be adjustable in length at 18 to adapt to the anchoring points of a respective passenger car. At the ends, the belt band is equipped with screw-on fittings 19 for connection at the anchoring points. With the aid of an additional fitting, not illustrated, it is possible to avoid an undesirable excessive looseness of the belt due to forwardly directed tensile stress when the belt band 17 is too long.

The guide arrangements 11 comprise, in addition to the eyelet fittings 12, elements 20 which connect the former with the belt band 17. The connecting elements 20 are each constituted by two parts which can be coupled together at 21. Of these parts, the parts cooperating with the belt band 17 are denoted as sliding parts 22, whereas the parts cooperating with the shoulder straps 1, 1' and/or the lap belt 14 are denoted as insert parts 23. The sliding parts 22 have each a eyelet fitting 24 at their free ends.

Figure 2:
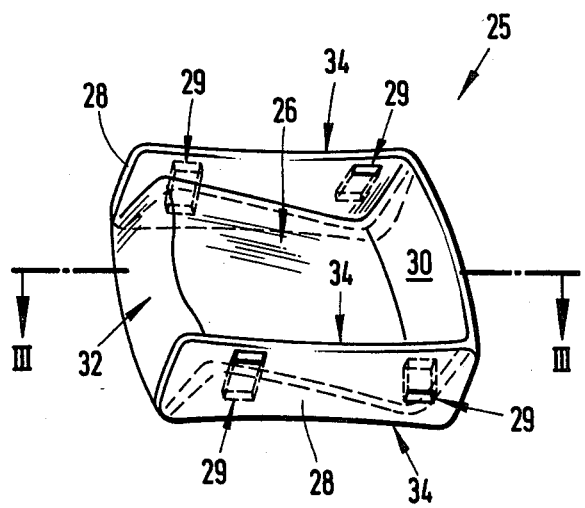
FIG. 2 illustrates the seat element in a perspective view.
Figure 3:
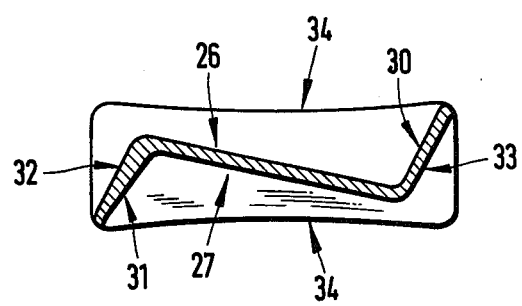
FIG. 3 illustrates a section along line III—III.

The aforedescribed safety device furthermore comprises a seat element 25 illustrated in FIG. 2. The seat element 25 is formed on two opposed sides with differently large seat contours 26, 27 (FIG. 3). The seat contours 26, 27 extend between common sidewalls 28. The seat element 25, which can be arranged on the seat cushion of a rear seat, is held at the vehicle body by way of the connecting elements 20 and the belt band 17. For this purpose, the sidewalls 28 are provided with perforations 29, in which the insert parts 23 of the connecting members 20 are introduced. The insert parts 23, penetrating the sidewalls 28 are then coupled to the sliding parts 22 with the eyelet fittings 24 arranged in the corner of the backrest and the seat cushion of a rear seat. When the seat element 25 is in use, the end sections 13, 13' of the shoulder straps 1, 1', forming the lap belt 14, are deflected over the eyelet fittings 12 arranged on the side of the seat contour of the sidewalls 28. If the seat element 15 is not required to accommodate a particular child, the insert parts 23 are decoupled from the eyelet fittings 24 of the sliding parts 22. The shoulder straps 1, 1' are now introduced into the eyelet fittings 24 and then again brought into operative connection with the length-adjusting fitting 2. Subsequently, the eyelet fittings 24 are to be arranged by way of the sliding parts 22 displaceably arranged on the belt band 17 in the close proximity of the pelvis of a child seated on the seat cushion of the rear seat.

The seat contours 26, 27 are each defined toward the rear by a sacrum support 30, 31 extending between the sidewalls 28. Each of the crossed-bar supports 30, 31 is fashioned to be inclined so that the back contour of a child is in harmony with the contour of the backrest of the seat fixedly attached to the car. Toward the front, each of the seat contours 26, 27 terminates in a support 32, 33 extending between the sidewalls 28 for the lower legs of a child.

The seat element 25 may be fashioned of one or several parts. Preferably, this element is an article molded or blow molded from a synthetic resin. For the seat contours 26, 27, a textile covering can be provided in each case, this covering being fixedly or removably attached. The sidewalls 28 are adapted along their contact surfaces 34 approximately to the contour of the seat cushion of the rear seat.

Within the scope of this invention, the device can also be utilized, without the seat element, for grown-up or adult occupants, if the shoulder straps are made of a sufficient length.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A device for retaining a child on the rear seat of an automobile comprising a belt system and a seat member having a seat surface contour bounded by side-walls having perforations therethrough, and being retained on said rear seat by said belt system, characterized by securing means secured to the vehicle body behind said rear seat and extending along at least a portion of the width thereof for slidingly receiving two connecting members, said connecting members extending through said perforations provided in said side-walls of said seat member and, at their ends adjacent said seating surface contour being each provided with pass-through fittings, belt bands extending through said pass-through fittings having first and second sections, said first sections being connectable with one another to form a lap belt, and said second sections extending beyond said pass-through fittings and forming shoulder belts cooperating with a single length-adjusting fittings situated behind a child to be retained, said length-adjusting fitting being connected with the belt band of a retractor through the intermediary of an exchangeable energy absorbing member, and said retractor being secured to the vehicle body.

2. A device according to claim 1, wherein the seat member is a moulded seat member formed of a synthetic resin and having a seating surface element provided with different seat contours on opposed sides thereof.

3. A device according to claim 2, wherein a textile covering is provided for the seat contours, which covering may be fixedly or detachably secured to the seat member.

4. A device for retaining a child on a seat of an automobile comprising a belt system and a seat member having a seat surface contour bounded by side-walls, and being retained on said rear seat by said belt system, characterized by securing means secured to the vehicle body behind said seat and receiving two connecting members which are provided at their ends adjacent said seating surface contour, with pass-through fittings through which extend belt bands having first and second sections, said first sections being connectable with one another to form a lap belt, and said second sections extending beyond said pass-through fittings forming shoulder belts cooperating with a length-adjusting fitting situated behind a child to be retained, wherein said seat contour is defined toward the rear of the seat member by a crossed-bar support being inclined so that the back contour of a child seated the reagainst corresponds with the contour of the backrest of the vehicle seat upon which the seat member is retained.

5. A device according to claim 4, wherein the seating member is provided with different seat contours having sidewall members and a crossed-bar support on opposed sides thereof.

6. A device according to claim 1, wherein a guide means for each strap is provided, each guide means including a pay-out fitting for slidably guiding the strap and connecting means for connecting said pay-out fitting with said securing means wherein said connecting means of said guide means includes at least two members arranged for coupling together, one of said members being slidably movable on said second securing means.

7. A device according to claim 1, wherein said securing means includes a strap member extending along a portion of the width of the seat, and is adjustable in length.

8. A device according to claim 2, wherein each seat contour is defined toward the rear of the seat member by a sacrum support extending between the sidewall members, each sacrum support being inclined so that the back contour of a child corresponds with the contour of the backrest of the vehicle seat supporting the seat member.

9. A device according to claim 8, wherein each seat contour terminates toward the front of the seat member in a support extending between the sidewall members for supporting the lower legs of a child.

* * * * *